June 10, 1952  M. W. MARIEN  2,600,310
PISTON PACKING RING
Filed Nov. 15, 1950

INVENTOR:
MELVIN W. MARIEN
BY Harry L. Benner
ATTORNEY

Patented June 10, 1952

2,600,310

UNITED STATES PATENT OFFICE 2,600,310

PISTON PACKING RING

Melvin W. Marien, Richmond Heights, Mo., assignor to Ramsey Corporation, Cleveland, Ohio, a corporation of Ohio Application November 15, 1950, Serial No. 195,876

9 Claims. (Cl. 309—44)

My invention has relation to improvements in piston packing rings and it consists in the novel features of construction more fully set forth in the specification and pointed out in the claims.

The principal object of the invention is to provide a piston ring for high speed internal combustion engines that effectively maintains contact with the cylinder wall to prevent inertia pressure from unseating the ring. The ring is thus essentially a compression ring in that it prevents blow-by, and at the same time exercises effective oil control.

It is the general belief among piston ring engineers, that in the modern high compression engines the ring is in a constant state of vibration during operation so only about half the time is it in effective contact with the cylinder wall. This accounts for blow-by and the loss of compression at high speeds. It is the object of the present invention to overcome these difficulties in the comparatively simple manner of utilizing the pressure in the combustion chamber to hold the ring in contact with the cylinder wall, and at the same time seal off the escape of compression gases around the ring.

Figure 1:
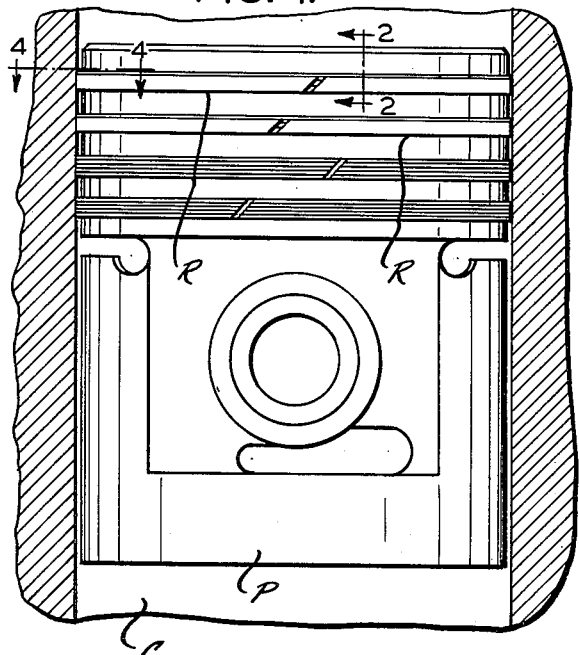
Figure 2:
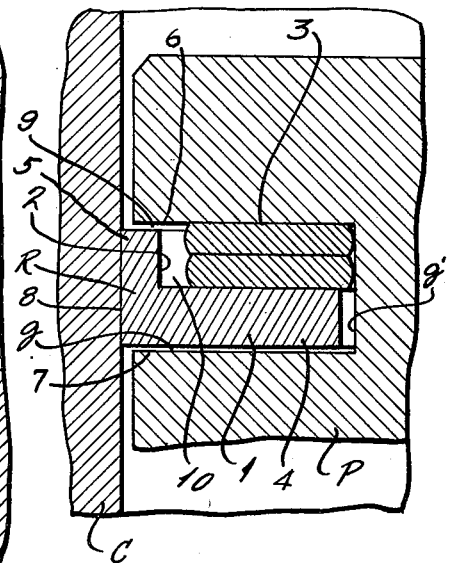
Figure 3:
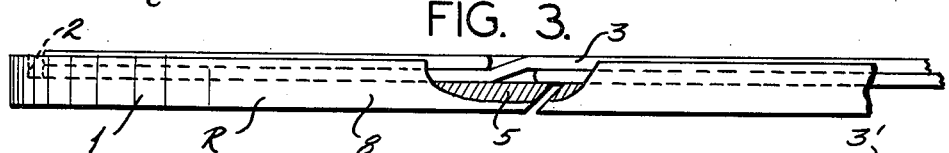
Figure 4:
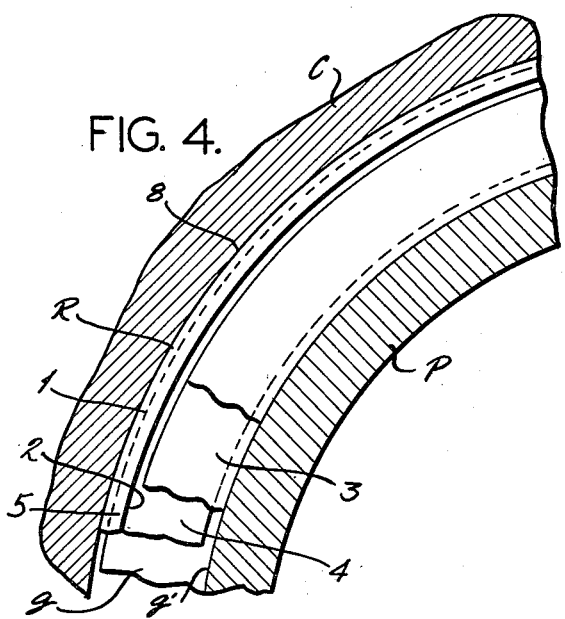
Figure 5:
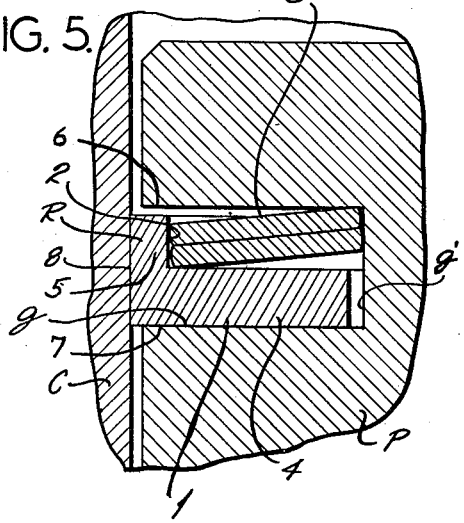

The manner of accomplishing these objects as well as other advantages inherent in the invention will be better apparent from a detailed description of the invention in connection with the accompanying drawings, in which:

Figure 1 is a side elevation of a conventional piston equipped with my improved piston rings, a part of the engine cylinder being shown in section; Fig. 2 is an enlarged cross-section taken on the line 2—2 of Fig. 1; Fig. 3 is a side elevation of a fragment of my improved ring with parts broken away; Fig. 4 is an enlarged horizontal section taken on the line 4—4 of Fig. 1 with parts broken away; and Fig. 5 is a cross-section similar to that shown in Fig. 2 showing a slightly modified form of the invention.

Referring to the drawings, P represents a conventional piston operable in a cylinder C and equipped with my improved compression rings R, R mounted in the usual grooves g, g.

The ring R is made up of two ring elements, the compression ring proper 1 of L-shaped cross-section whereby a circumferential recess 2 is provided to receive a spacing ring 3 formed in the shape of a two-coil helix and operating to contract radially to closely hug the bottom g' of groove g. Thus the ring 3 does not operate to augment the expansive radial pressure of ring 1 against the cylinder wall, but does operate to exert axial pressure against ring 1 within the groove to serve as a side spacer for said ring. The greater radial depth of cross-section of ring component 4 over that of flange component 5 causes the ring 1 to twist slightly in the groove g and thus more snugly hug the side walls or lands 6 and 7 thereof. The wide outside face 8 of ring 1 is the cylinder contacting face and assumes a slight taper with respect to the cylinder wall but this in nowise impairs the operation of the ring. In fact, it facilitates its breaking-in action as is well understood in the art.

It will be observed that the width of face 8 is slightly less than the combined width of ring component 5 and spacing ring 3 so that a space 9 is provided at all periods of the ring operation. Pressure of the cylinder gases is thus permitted to enter through the space 9 into the annular space 10 between flange component 5 and ring 3 and exert an outward radial force on ring 1 to assist in holding the same in intimate contact with the cylinder wall.

In the modification shown in Fig. 5 the ring 3' is formed with a slight dish so as to increase the side pressure against the ring 1 when the ring assembly is in the piston groove.

Having described my invention, I claim:

1. A piston packing ring comprising an outer expanding cylinder contacting element, and an inner contracting groove embracing element.

2. A piston packing ring comprising an outer expanding cylinder contacting element, and an inner contracting groove embracing element, the latter being formed as a helix of two or more turns.

3. A piston packing ring comprising an outer expanding cylinder contacting element, and an inner contracting groove embracing element, the radial depth of the latter being less than that of the former so as to provide a gas chamber between said elements.

4. A piston packing ring comprising an outer expanding cylinder contacting element, and an inner contracting groove embracing element, the latter being slightly dished flatwise to serve as a side spacer for the former in the ring groove.

5. A piston packing ring comprising an outer expanding cylinder contacting element and an inner contracting groove embracing element, said elements being arranged to provide an annular gas chamber between them.

6. A piston packing ring comprising an outer split ring element, a marginal flange forming a part of the cylinder contacting face of said ring whereby an annular recess is provided at the rear of said element, and a contracting ring element disposed in said recess.

7. A piston packing ring comprising an outer split ring element, a marginal flange forming a part of the cylinder contacting face of said ring whereby an annular recess is provided at the rear of said element, and a contracting ring element disposed in said recess, the width of said cylinder contacting face being less than the combined widths of the expanding element at the offset and the contracting element.

8. A piston packing ring comprising an outer split ring element, a marginal flange forming a part of the cylinder contacting face of said ring whereby an annular recess is provided at the rear of said element, and a contracting ring element disposed in said recess, the width of said cylinder contacting face being less than the combined widths of the expanding element at the offset and the contracting element, said elements being arranged to provide an annular gas chamber between them.

9. A piston packing ring comprising an outer split ring element, a marginal flange forming a part of the cylinder contacting face of said ring whereby an annular recess is provided at the rear of said element, and a helical contracting ring element disposed in said recess.

MELVIN W. MARIEN.

REFERENCES CITED

The following references are of record in the file of this patent:

UNITED STATES PATENTS

| Number | Name | Date |
|---|---|---|
| 1,357,729 | Schaap | Nov. 2, 1920 |
| 1,426,403 | Morrow et al. | Aug. 22, 1922 |
| 1,902,781 | Isle | Mar. 21, 1933 |
| 2,052,077 | Bristow | Aug. 25, 1936 |
| 2,260,031 | Johnston | Oct. 21, 1941 |
| 2,459,157 | Frisby | Jan. 18, 1949 |